US006391935B1

(12) United States Patent
Hager et al.

(10) Patent No.: US 6,391,935 B1
(45) Date of Patent: May 21, 2002

(54) VISCOELASTIC POLYURETHANE FOAMS

(75) Inventors: Stanley L. Hager, Cross Lanes; Veril C. Jividen, Scott Depot, both of WV (US); Sebastien P. Triouleyre, Chantilly; Faouzi Joulak, Lamorlaye, both of (FR)

(73) Assignee: Bayer Antwerp, N.V., Antwerp (BE)

( * ) Notice: Subject to any disclaimer, the term of this patent is extended or adjusted under 35 U.S.C. 154(b) by 0 days.

(21) Appl. No.: 09/495,192

(22) Filed: Jan. 31, 2000

(51) Int. Cl.[7] ................................................. C08G 18/06
(52) U.S. Cl. ........................ 521/170; 521/157; 521/172; 521/174
(58) Field of Search .................. 521/170, 172, 521/174, 157

(56) References Cited

U.S. PATENT DOCUMENTS

| 3,875,086 | A | | 4/1975 | Ramey et al. | |
|---|---|---|---|---|---|
| 4,209,593 | A | | 6/1980 | Khanna | 521/163 |
| 4,367,259 | A | | 1/1983 | Fulmer et al. | 428/240 |
| 3,405,077 | A | | 10/1986 | Pastor et al. | |
| 4,722,946 | A | | 2/1988 | Hostettler | 521/158 |
| 4,839,397 | A | | 6/1989 | Lohmar et al. | 521/159 |
| 4,950,695 | A | * | 8/1990 | Stone | 521/174 |
| 4,980,386 | A | | 12/1990 | Tiao et al. | 521/108 |
| 4,981,880 | A | | 1/1991 | Lehmann et al. | 521/174 |
| 4,987,156 | A | | 1/1991 | Tozune et al. | 521/99 |
| 5,420,170 | A | | 5/1995 | Lutter et al. | 521/159 |
| 5,631,319 | A | | 5/1997 | Reese et al. | 524/590 |
| 5,919,395 | A | | 7/1999 | Bastin et al. | 252/182.24 |
| 6,136,879 | A | | 10/2000 | Nishida et al. | 521/174 |

FOREIGN PATENT DOCUMENTS

| CA | 2246636 | 1/1999 |
|---|---|---|
| JP | 07324161 | 12/1995 |

* cited by examiner

Primary Examiner—John M. Cooney, Jr.
(74) Attorney, Agent, or Firm—Joseph C. Gil; Lyndanne M. Whalen; N. Denise Brown

(57) ABSTRACT

Viscoelastic foams and a process for making them are disclosed. The foams are produced with a unique isocyanate-reactive mixture that includes a low equivalent weight polyol and from about 15 to about 70 wt. % of a polyester or polyoxyalkylene monol having a number average equivalent weight greater than about 1000. The monol is the key to formulating excellent viscoelastic foams over a broad range of processing conditions and isocyanate indices. A "reactive" monol gives TDI-based viscoelastic foams with improved "hand feel" and reduced levels of residual toluenediamines.

29 Claims, No Drawings

VISCOELASTIC POLYURETHANE FOAMS

FIELD OF THE INVENTION

The invention relates to viscoelastic polyurethane foams and a process for making them. These soft foams, which incorporate a polyoxyalkylene monol, are useful in a wide variety of applications such as bedding, shoe soles, ear plugs, and protective sports equipment.

BACKGROUND OF THE INVENTION

Flexible, viscoelastic polyurethane foam (also known as "dead" foam, "slow recovery" foam, or "high damping" foam) is characterized by slow, gradual recovery from compression. While most of the physical properties of viscoelastic foams resemble those of conventional foams, the resilience of viscoelastic foams is much lower, generally less than about 15%. Suitable applications for viscoelastic foam take advantage of its shape conforming, energy attenuating, and sound damping characteristics. For example, the foam can be used in mattresses to reduce pressure points, in athletic padding or helmets as a shock absorber, and in automotive interiors for soundproofing.

Various synthetic approaches have been used to make viscoelastic foam. Formulators have modified the amount and type of polyol(s), polyisocyanate, surfactants, foaming catalysts, fillers (see, e.g., U.S. Pat. No. 4,367,259), or other components, to arrive at foams having low resilience, good softness, and the right processing characteristics. Too often, however, the window for processing these formulations is undesirably narrow.

Most flexible, viscoelastic polyurethane foam is produced at low isocyanate index (100 times the mole ratio of —NCO groups to NCO—reactive groups in the formulation). Usually, the index is less than about 90. See, for example, U.S. Pat. No. 4,722,946 (index: 65–85), U.S. Pat. No. 4,980,386 (index: 65–90), and U.S. Pat. No. 4,839,397 (index: <80). Simply raising the index makes it difficult to achieve the required softness, as evidenced by higher-than-desirable IFD or CLD numbers (see Comparative Example 36 below).

Unfortunately, low-index foam formulations are extremely sensitive to small changes in catalyst and surfactant amounts, so the processing window is undesirably narrow and special (translation: expensive) silicones are often needed to avoid shrinkage or foam collapse. Foams made at low index are prone toward high compression sets and also tend to discolor upon exposure to heat or ultraviolet light. Moreover, when toluene diisocyanate (TDI) is used to make viscoelastic foams at low index, the foams can contain undesirably high levels of toluenediamines, particularly after the normal curing process. (Toluenediamines are now under severe public and regulatory scrutiny in Europe because they are highly toxic and possible carcinogens.) In addition, it is often difficult to make low-resilience foams having a good balance of physical properties at indices below 90.

Other approaches to making viscoelastic foam hinge on finding the right mixture of polyether polyols and other components. For example, U.S. Pat. No. 4,987,156 arrives at a soft, low-resilience foam with a mixture of high and low molecular weight polyols, each of which has a hydroxyl functionality of at least 2, and a plasticizer having a solidification point less than −20° C. U.S. Pat. No. 5,420,170 teaches to use a mixture that includes one polyol having a hydroxyl functionality of 2.3–2.8, and another polyol having functionality 2–3. Recently issued U.S. Pat. No. 5,919,395 takes a similar approach with a polyol mixture that contains a 2500 to 6500 molecular weight polyol having a functionality of 2.5 to 6 and a rigid polyol having molecular weight 300 to 1000 and a functionality of 2.5 to 6. None of these patents teaches to include a monofunctional polyether (a "monol") in the formulation.

Monofunctional alcohols have been included in flexible polyurethane foams for various reasons, but they have rarely appeared in a viscoelastic foam. Most references that include a monol teach foams with high resilience (see, e.g., U.S. Pat. Nos. 4,981,880, 3,875,086, and 3,405,077). Other references teach the use of low molecular weight monofunctional materials. For example, U.S. Pat. No. 5,631,319 teaches to use a $C_1$–$C_{25}$ monoalcohol combined with a hydroxyketone in non-viscoelastic foam. U.S. Pat. No. 4,209,593 teaches to use a naphthol or other "bulky" monohydroxy compound to make an energy-absorbing foam. Unfortunately, including low-molecular-weight (<1000), high hydroxyl number (>60 mg KOH/g) monols in viscoelastic foams can adversely impact important foam properties, particularly compression sets (see Comparative Examples 14 and 15 below). In addition, any monol can remain largely unreacted, especially in a low-index formulation, resulting in a foam that is oily to the touch (i.e., has poor "hand feel").

U.S. Pat. No. 4,950,695 teaches to use a monofunctional alcohol or polyether to soften flexible polyurethane foams. The formulations also include a 2000 to 6500 molecular weight triol. Because the inventors did not bother to report resilience values, a skilled person would infer that the foams lack viscoelastic character.

European Pat. Appl. No. 0 913 414 teaches to make viscoelastic polyurethane foams that may contain a polyether monol. The monol, which has a molecular weight less than 1500, is used with a polyol that has a molecular weight greater than 1800. All of the examples show low-index (less than 90) foams.

In sum, most viscoelastic foams are made at isocyanate indices below 90, but the industry would benefit from a better way to formulate these low-resilience foams at higher index values. In particular, formulations that provide a wider processing window are needed. Desirable formulations would give foams with a favorable balance of properties, including low resilience, good softness, low compression sets, and good "hand feel." A valuable TDI-based formulation would produce foams having reduced levels of toluenediamines.

SUMMARY OF THE INVENTION

The invention is a viscoelastic polyurethane foam and a process for making it. The foam is produced using a unique isocyanate-reactive mixture that includes a polyester or polyoxyalkylene polyol and from about 15 to about 70 wt. % of a polyester or polyoxyalkylene monol. The monol has a number average equivalent weight greater than about 1000, and the polyol has a number average equivalent weight less than about 600. When this isocyanate-reactive mixture is combined with a polyisocyanate, water, a surfactant, and one or more catalysts at an isocyanate index of at least 90, the result is a viscoelastic polyurethane foam having a resilience of less than 15% and an excellent overall balance of physical properties.

We surprisingly found that using the monol-containing isocyanate-reactive mixture described above is the key to formulating viscoelastic foams over a broad range of processing conditions and isocyanate indices. In spite of the relatively high molecular weight of the monols, the resulting foams retain their low resilience and good damping properties. Moreover, the foams have good softness and low compression sets. We also unexpectedly discovered that by using a "reactive" mono (i.e., a monol having a high content of primary hydroxyl groups) in TDI-based formulations at indices higher than 95, we could make foams with improved "hand feel" and reduced levels of residual toluenediamines.

DETAILED DESCRIPTION OF THE INVENTION

Viscoelastic polyurethane foams of the invention include, in addition to conventional components, a unique isocyanate-reactive mixture. The mixture includes a polyester or polyoxyalkylene monol and a polyester or polyoxyalkylene triol. Optionally, a chain extender or crosslinker is included.

The polyester or polyoxyalkylene mono has one hydroxyl group per molecule, and an average equivalent weight greater than about 1000. Thus, it also has a number average molecular weight (Mn) greater than about 1000. Preferably, the monol has an average equivalent weight greater than about 1500, and most preferably greater than about 2000. Preferred monols have a hydroxyl number less than about 56 mg KOH/g.

The monol can be a polyester. Polyesters contain recurring units of a carboxylic acid derivative (e.g., anhydride, diacid) and a glycol or diol. The polyester contains only one hydroxyl group. The other end groups are ones that do not react with isocyanates, such as alkyl, aryl, or aralkyl-substituted ethers or esters.

More preferred monols are polyoxyalkylene monols. These are conveniently made by reacting a monoalcohol (methanol, ethanol, phenols, allyl alcohol, higher molecular weight alcohols, or the like) with multiple equivalents of an epoxide such as ethylene oxide, propylene oxide, butylene oxides, or the like, or mixtures thereof. The epoxide can be polymerized using well-known techniques and a variety of catalysts, including alkali metals, alkali metal hydroxides and alkoxides, double metal cyanide complexes, and many others. The monols can also be made by first producing a polyoxyalkylene diol or triol and then converting all but one of the remaining hydroxyl groups to ether, ester, or other non-reactive derivatives using known methods.

The polyoxyalkylene monols can have any desired arrangement of oxyalkylene units. For example, the monols can be PO homopolymers, block EO-PO copolymers, EO-capped polyoxypropylenes, random EO/PO copolymers, PO polymers that are "tipped" with a mixture of EO and PO to achieve a desired primary hydroxyl content, or any other desired configuration.

A preferred class of polyoxyalkylene monols consists of polyoxypropylene monols having average equivalent weights greater than about 1000, more preferably greater than about 1500, and most preferably greater than about 2000. We found that these all-PO monols, which have hydroxyl numbers less than or equal to 56 mg KOH/g, greatly expand the processability window for making viscoelastic foams. See, for example, the wide range of water levels and indices suitable for use in making viscoelastic foams with the all-PO monols (M6 and M7) in Examples 9–13 (Table 2), Examples 20–22 (Table 4), and Examples 27–29 (Table 5) below. When a lower molecular weight (hydroxyl number=112 mg KOH/g) all-PO monol (M5) is used instead, important properties such as compression set suffer (see Comparative Examples 14 and 15, Table 2).

Another preferred class of monols consists of "EO-tipped" monols, which are usually made by finishing the epoxide polymerization with a mixture of EO and PO in a ratio effective to give between 15% and 50% primary hydroxyl end groups. The use of EO-tipped monols contributes to excellent processing and foam properties. See Example 18, below (Table 3), which includes an EO-tipped monol (M8).

Yet another preferred class of monols are "EO-capped" monols, which have a primary hydroxyl group content greater than about 50%, more preferably greater than about 80%, and most preferably greater than about 90%. These are "reactive" monols that have high reactivity with polyisocyanates. In spite of the value of all-PO monols for vastly improving processing characteristics of viscoelastic foam, we found that their low reactivity can at times cause the foams to contain enough unreacted monol to make them oily to the touch. Reactive monols overcome this problem, as the "hand feel" results in Table 6 below demonstrate. The added reactivity permits incorporation of even 50 wt. % monol based on the amount of isocyanate-reactive mixture (see Examples 32–35), and enables preparation of foams at indices well over 100. As Table 6 also shows, the foams made at 100 index and above with reactive monols have exceptionally low residual toluenediamine contents after a simulated typical curing process (4 h at 140° C.).

The polyester or polyoxyalkylene monol is present in an amount within the range of about 15 to about 70 wt. % based on the amount of isocyanate-reactive mixture. A more preferred range is from about 20 to about 60 wt. %; most preferred is the range from about 25 to about 50 wt. %.

The isocyanate-reactive mixture includes a polyester or polyoxyalkylene polyol. These polyols have hydroxyl functionalities of 2 or greater, preferably from about 2 to 8, more preferably from about 3 to 6. Triols are particularly preferred.

The polyols have a number average equivalent weight less than about 600, preferably less than about 500, and most preferably less than about 400. Preferred polyols have hydroxyl numbers greater than about 94 mg KOH/g, more preferably greater than about 112 mg KOH/g, and most preferably greater than about 140 mg KOH/g.

The polyol can be a polyester, prepared as described earlier for the monols, except that two or more hydroxyl groups are present. Preferred polyols are polyoxyalkylene polyols. These are conveniently made by reacting compounds having two or more active hydrogens (e.g., glycols, triols, tetrols, hexols, and polyfunctional amines) with one or more equivalents of an epoxide as described earlier. Like the monols, the polyols can have any desired arrangement of oxyalkylene units. Thus, the polyols can be PO homopolymers, block EO-PO copolymers, EO-capped polyoxypropylenes, random EO/PO copolymers, PO polymers that are "tipped" with a mixture of EO and PO to achieve a desired primary hydroxyl content, or any other desired configuration.

The polyol is normally present in an amount within the range of about 30 to about 85 wt. % based on the total amount of isocyanate-reactive mixture. A more preferred range is from about 40 to about 70 wt. %.

The isocyanate-reactive mixture optionally includes a minor proportion of a chain extender or crosslinker in addition to the monol and polyol. Suitable chain extenders include low molecular weight diols and diamines such as ethylene glycol, propylene glycol, diethylene glycol, dipropylene glycol, 2-methyl-1,3-propanediol, ethylene diamine, 1,6-hexanediol, and the like, and mixtures thereof. Suitable crosslinkers include triols and alkanolamines such as trimethylolpropane, glycerine, sorbitol, ethanolamine, diethanolamine, triethanolamine, and the like, and mixtures thereof. When a chain extender or crosslinker is included, it is typically used in an amount within the range of about 0.1 to about 5 wt. %, preferably from about 0.5 to about 3 wt. %, based on the amount of isocyanate-reactive mixture. Preferred chain extenders and crosslinkers have molecular weights less than about 300 g/mole, more preferably less than about 200 g/mole.

Polyisocyanates suitable for use in the invention contain two or more free —NCO groups per molecule and are those conventionally used to make flexible polyurethane foam. Useful polyisocyanates include aromatic, aliphatic, and cycloaliphatic di- and polyisocyanates. Examples include toluene diisocyanates (TDI), diphenylmethane diisocyanates (MDI), naphthalene diisocyanates, isophorone diisocyanate, hexamethylene diisocyanates (HDI), polymeric MDIs, and polyisocyanates modified with carbodiimide, ester, urea, urethane, allophanate, isocyanurate, biuret, or other functionalities, and the like, and mixtures thereof. Preferred polyisocyanates are TDI (usually a mixture of 2,4- and 2,6-isomers), MDIs, and mixtures of these.

The amount of polyisocyanate used is normally adjusted to arrive at a desired isocyanate index. Generally, the amount used will be within the range of about 20 to about 50 wt. %, more preferably from about 25 to about 40 wt. %, based on the combined amounts of isocyanate-reactive mixture and polyisocyanate.

An advantage of the invention is the ability to formulate viscoelastic foams over a wide range of water levels and isocyanate indices. In particular, exceptionally high indices (compared with commercial viscoelastic foam) can be used. In general, the NCO index will be within the range of about 90 to about 120. A more preferred index range is from about 95 to about 110. As the examples in Table 4 below show, excellent viscoelastic foams can be produced throughout the normal range of indices for ordinary flexible polyurethane foam. In contrast, most viscoelastic foams are formulated at indices below 90 (see Background).

Water is used as a reactive blowing agent to make the foams of the invention. The amount needed depends on a number of factors, including the desired foam density and softness, the nature of the polyisocyanate and isocyanate-reactive mixture, the desired processing characteristics, whether an auxiliary blowing agent (e.g., dichloromethane or an HCFC) is used, and other factors. Usually, water is used in an amount within the range of about 0.1 to about 10 parts per 100 parts of isocyanate-reactive mixture. A more preferred range is from about 0.5 to about 5 parts; most preferred is the range from about 1 to about 3 parts.

The foam is usually produced in the presence of a surfactant, which helps to stabilize the foam until it cures. Suitable surfactants are those well known in the polyurethane industry. A wide variety of organosilicone surfactants are commercially available. Examples are Niax L-620 surfactant, a product of CK Witco, and B8002, a product of Goldschmidt. The surfactant is typically used in an amount within the range of about 0.1 to 5, preferably from about 0.2 to 3, parts per 100 parts of isocyanate-reactive mixture.

A mixture of polyurethane catalysts is normally used to catalyze the reactions of the monol, polyol, water, and chain extenders or crosslinkers with the polyisocyanate. It is common to use both an organoamine and an organotin compound for this purpose. Suitable polyurethane catalysts are well known in the art; an extensive list appears in U.S. Pat. No. 5,011,908, the teachings of which are incorporated herein by reference. Suitable organotin catalysts include tin salts and dialkyltin salts of carboxylic acids. Examples include stannous octoate, dibutyltin dilaurate, dibutyltin diacetate, stannous oleate, and the like. Stannous octoate and dibutyltin dilaurate are particularly preferred. Preferred organoamine catalysts are tertiary amines such as trimethylamine, triethylamine, triethylenediamine, bis(2,2'-dimethylamino)ethyl ether, N-ethylmorpholine, diethylenetriamine, and the like. The polyurethane catalysts are typically used in an amount within the range of about 0.001 to about 2 parts, more preferably from about 0.05 to about 1 part, per 100 parts of isocyanate-reactive mixture.

The foams optionally include a plasticizer. Suitable plasticizers are substances that add further softness to the foam. Examples include dioctyl phthalate, distearyl phthalate, diisodecyl phthalate, dioctyl adipate, tricresyl phosphate, triphenyl phosphate, and the like. When a plasticizer is used, it is preferably present in an amount within the range of about 0.1 to about 30 wt. %, more preferably from about 5 to about 20 wt. %, based on the amount of isocyanate-reactive mixture. Flame retardants, antioxidants, pigments, dyes, fillers, and many other commercial additives can also be included in the foams in conventional amounts.

The foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

Although less preferred, a prepolymer approach to making the foams can also be used. In this approach, a significant portion of the isocyanate-reactive mixture is reacted with the polyisocyanate, and the resulting prepolymer is then reacted with the remaining components.

Foams of the invention have low resilience, i.e., less than 15% as measured in the standard ball rebound test (ASTM D 3574-95, Test H). Preferably, the foams have resilience less than 10%; most preferred are foams having a resilience of less than 5%. In addition, the foams preferably have a high degree of softness, as indicated by 25% IFD (indentation force deflection at 25% compression, ASTM D 3574, Test $B_1$) values that are preferably less than about 15 lbs., and more preferably less than about 10 lbs. Alternatively, a compression load deflection (CLD) test (ISO 3386-1 with measurement at the first compression cycle) may be used to indicate the preferred foam softness. Using this test method, a 40% CLD value of less than 1.5 kPa is preferred. Preferred foams also have low compression sets. For example, preferred foams exhibit a 90% compression set value, $C_d$ (ASTM D 3574, Test D), of less than about 15%, more preferably less than about 10%.

The following examples merely illustrate the invention. Those skilled in the art will recognize many variations that are within the spirit of the invention and scope of the claims.

EXAMPLES

Preparation of Viscoelastic Foams—General Procedure

The following procedure is used for Examples 1-31. A series of nominally 3 pound/ft$^3$ (pcf free-rise viscoelastic foams is prepared in the laboratory using conventional bench foaming procedures. The ingredients other than toluene diisocyanate (TDI) are mixed thoroughly. Next, TDI (commercial 80:20 mixture of 2,4- and 2,6-isomers) is added and mixed briefly. The mixture is poured into a standard 14 inch (35.6 cm)×14 inch×6 inch (15.2 cm) cake box. The mixture is allowed to rise freely to full height, after which the degree of settling is measured. The foam is cured in an oven at 125° C. for 5 min. (or in a few cases, at 150° C. for 30 min.). After a minimum of 16 h at room temperature, shrinkage, if any, is noted, and a 12 inch (30 cm)×12 inch×4 inch (10 cm) sample is cut for physical testing. The formulations, processing characteristics, and foam properties are noted in Tables 1–5.

A slightly different procedure is used for Examples 32–39. The foams are nominally 80 kg/m$^3$ (5 pounds/ft$^3$). The TDI used is a commercial blend that contains a 65:35 mixture of 2,4- and 2,6-isomers. The reacting mixture is allowed to rise freely to full height, and the resulting foam is cured in an oven at 140° C. for 4 h. After a minimum of 24 h at room temperature, 4 samples of 1 cm×1 cm×10 cm are cut for toluenediamine (TDA) analysis, and a 12 inch (30 cm)×12 inch×4 inch (10 cm) sample is cut for physical testing. The content of residual 2,4-TDA in the foam is measured in accordance with the method approved by the Isocyanate Producers Association (ISOPA). The method involves extraction of TDA from a foam sample with aqueous acetic acid solution; no derivatization is used. Table 6 summarizes the formulations and foam properties.

Examples 1–6 and Comparative Examples 7–8
(Table 1)

These examples show how the claimed isocyanate-reactive mixtures enable formulation of low-resilience foam at high NCO index. Comparative Example 8 is a typical commercial viscoelastic foam formulated at 83 index. Examples 1–6 show that a range of monols prepared using different catalysts (KOH or double metal cyanide) and having different amounts of oxyethylene contents and different hydroxyl numbers can be used to formulate viscoelastic foam at 100 index. The foams process as well or better than the control and have no shrinkage problems. In addition, they generally have a favorable balance of physical properties. Comparative Example 7 shows that the monol equivalent weight is important: at hydroxyl number 112 mg KOH/g (about 500 equivalent weight), the foam compression sets are unacceptable.

Examples 9–13 and Comparative Examples 14 and 15 (Table 2)

These examples further illustrate the importance of mono hydroxyl number. Note the higher-than-acceptable compression sets of the foams made using the 112 mg KOH/g hydroxyl number monol. In contrast, the foams of Examples 9–13 exhibit low compression sets and good overall foam properties.

Examples 16–19 and Comparative Example 8
(Table 3)

A wide range of different polyols, crosslinkers, and chain extenders can be used with the monol to make viscoelastic foams at 100 index. The foams have excellent processing and properties that rival those of the commercial, low-index foam (Comparative Example 8).

Examples 20–25 and Comparative Example 26
(Table 4)

The use of the claimed isocyanate-reactive mixture allows formulators great latitude in varying the isocyanate index. Good foams are easily made at indices from 95 to 110. As Comparative Example 26 illustrates, it is not possible to merely increase the NCO index in the commercial formulation. Doing so results in poor processing, excessive shrinkage, and a product that is not testable.

Examples 27–29 and Comparative Examples 30–31
(Table 5)

The effect of water level is shown here. With a 14 mg KOH/g hydroxyl number monol present, the water level can range from 1 to 3 parts per hundred parts of isocyanate-reactive mixture while maintaining good processing and good foam properties. In contrast, when the commercial formulation is modified from 2 parts water to 1 part water (Comparative Example 30), processing falters, the foam shrinks, and testing is not possible. Similar problems occur at 100 index (Comparative Example 31).

Examples 32–35 and Comparative Examples 36–39
(Table 6)

A reactive monol is advantageous for making viscoelastic foams at high indices with good "hand feel" and low residual levels of toluenediamines. Foams made from an all-PO monol can be oily to the touch if the monol does not react completely with the polyisocyanate. 2,4-Toluenediamine levels in cured (140° C., 4 h) foam of less than 5 ppm can be achieved by producing the foams at 100 index and above using the reactive monol (Examples 32–35). These levels are much lower than those found in foams made at lower isocyanate indices without monol and with all-PO monols (see Comparative Examples 36–39).

TABLE 1

Effect of Monol Type

| Example | 1 | 2 | 3 | 4 | 5 | 6 | C7 | C8 |
|---|---|---|---|---|---|---|---|---|
| Formulation | | | | | | | | |
| Monol | M1 | M2 | M3 | M6 | M7 | M8 | M5 | — |
| pbw | 50 | 50 | 50 | 50 | 40 | 50 | 50 | — |
| Polyol | P1 | P1 | P1 | P1 | P1 | P1, P4 | P1 | P2 |
| pbw | 50 | 50 | 50 | 50 | 60 | 24, 34 | 50 | 100 |
| DEOA | — | — | — | — | — | — | — | 0.4 |
| Water | 2.0 | 2.0 | 2.0 | 2.0 | 2.0 | 1.9 | 2.0 | 2.0 |
| C-183 | 0.45 | 0.45 | 0.45 | — | — | 0.42 | 0.45 | — |
| 33-LV | — | — | — | 0.70 | 0.70 | — | — | — |
| T-9 | 0.08 | 0.08 | 0.08 | 0.04 | 0.06 | 0.10 | — | 0.04 |
| T-12 | — | — | — | — | — | — | 0.10 | — |
| L-620 | 0.6 | 0.6 | 0.6 | 0.6 | 0.6 | 0.5 | 0.8 | 0.4 |
| FR | 3.0 | 3.0 | 3.0 | 3.0 | 3.0 | 3.0 | 3.0 | 5.0 |
| TDI (80/20) | 35.9 | 35.6 | 33.4 | 35.1 | 35.8 | 33.6 | 41.0 | 35.4 |
| Index | 100 | 100 | 100 | 100 | 100 | 100 | 100 | 83 |
| Foam Processing | | | | | | | | |
| Blowoff, s | 180 | 177 | 160 | 240 | 158 | 186 | 119 | 229 |
| Settle, % | 1.1 | 0.8 | 1.5 | 0.3 | 1.0 | 1.3 | 1.0 | 6.0 |
| Shrink | nil | nil | nil | nil | nil | nil | nil | nil |
| Foam Properties | | | | | | | | |
| Density, pcf | 2.58 | 2.65 | 2.65 | 2.66 | 2.74 | 2.81 | 2.51 | 3.15 |
| Resilience, % | 11 | 13 | 11 | 11 | 8 | 14 | 3 | 10 |
| Air flow, scfm | 3.7 | 3.3 | 1.6 | 2.8 | 1.8 | 0.8 | 4.2 | 0.7 |
| 25% IFD, lbs | 7.5 | 8.5 | 13.1 | 10.9 | 11.6 | 12.8 | 3.7 | 10.6 |
| 25% Return, % | 82.2 | 83.6 | 77.3 | 77.7 | 62.3 | 80.5 | 41.9 | 87.5 |
| Tensile, psi | 7.6 | 6.3 | 7.1 | 8.1 | 11.5 | 8.4 | 1.9 | 9.6 |
| Elongation, % | 215 | 182 | 199 | 174 | 235 | 206 | 106 | 238 |
| Tear, pli | 0.7 | 0.7 | 0.5 | 0.6 | 0.8 | 0.7 | 0.2 | 0.9 |
| 90% CS, % | 81.3 | 32.5 | 8.1 | 10.6 | 5.3 | 11.2 | 99.8 | 5.9 |
| 75% HACS, % | 28.5 | 44.3 | 10.9 | 10.4 | 7.2 | 7.5 | 98.5 | 11.4 |

Effect of Monol Hydroxyl Number

| Example | 9 | 10 | 11 | 12 | 13 | C14 | C15 |
|---|---|---|---|---|---|---|---|
| Formulation | | | | | | | |
| Monol | M6 | M6 | M7 | M7 | M7 | M5 | M5 |
| pbw | 40 | 50 | 30 | 40 | 50 | 40 | 50 |
| OH # | 35 | 35 | 14 | 14 | 14 | 112 | 112 |
| Polyol | P1 | P1 | P1 | P1 | P1 | P1 | P1 |
| pbw | 60 | 50 | 70 | 60 | 50 | 60 | 50 |
| Water | 2.0 | 2.0 | 2.0 | 2.0 | 2.0 | 2.0 | 2.0 |
| C-183 | — | — | — | — | — | 0.45 | 0.45 |
| 33-LV | 0.70 | 0.70 | 0.70 | 0.70 | 0.70 | — | — |
| T-9 | 0.04 | 0.04 | 0.04 | 0.06 | 0.08 | 0.04 | — |
| T-12 | — | — | — | — | — | 0.04 | 0.10 |
| L-620 | 0.6 | 0.6 | 0.6 | 0.6 | 0.6 | 0.6 | 0.8 |
| FR | 3.0 | 3.0 | 3.0 | 3.0 | 3.0 | 3.0 | 3.0 |
| TDI (80/20) | 37.1 | 35.1 | 38.2 | 35.8 | 33.5 | 41.9 | 41.0 |
| Index | 100 | 100 | 100 | 100 | 100 | 100 | 100 |
| Foam Processing | | | | | | | |
| Blowoff, s | 238 | 240 | 164 | 158 | ND | 178 | 119 |
| Settle, % | 0.3 | 0.3 | 0.8 | 1.0 | 1.7 | 2.7 | 1.0 |
| Shrink | nil | nil | nil | nil | nil | nil | nil |
| Foam Properties | | | | | | | |
| Density, pcf | 2.68 | 2.66 | 2.67 | 2.74 | 2.70 | 2.76 | 2.51 |
| Resilience, % | 10 | 11 | 6 | 8 | 11 | 6 | 3 |
| Air flow, scfm | 1.4 | 2.8 | 0.9 | 1.8 | 2.3 | 2.3 | 4.2 |
| 25% IFD, lbs | 12.3 | 10.9 | 15.2 | 11.6 | 6.8 | 7.3 | 3.7 |
| 25% Return, % | 77.8 | 77.7 | 68.7 | 62.3 | 49.8 | 80.4 | 41.9 |
| Tensile, psi | 8.6 | 8.1 | 15.4 | 11.5 | 5.8 | 5.5 | 1.9 |

-continued

Effect of Monol Hydroxyl Number

| Example | 9 | 10 | 11 | 12 | 13 | C14 | C15 |
|---|---|---|---|---|---|---|---|
| Elongation, % | 180 | 174 | 232 | 235 | 171 | 223 | 106 |
| Tear, pli | 0.6 | 0.6 | 1.3 | 0.8 | 0.4 | 0.7 | 0.2 |
| 90% CS, % | 6.4 | 10.6 | 2.5 | 5.3 | 16.2 | 97.0 | 99.8 |
| 75% HACS, % | 8.1 | 10.4 | 4.0 | 7.2 | 24.6 | 78.4 | 98.5 |

TABLE 3

Polyol Variety

| Example | 5 | 16 | 17 | 18 | 19 | C8 |
|---|---|---|---|---|---|---|
| Formulation | | | | | | |
| Monol | M7 | M7 | M7, M6 | M7, M8 | M7 | — |
| pbw | 40 | 40 | 30, 12 | 21, 21 | 40 | — |
| Polyol | P1 | P4 | P5 | P5 | P1, P4 | P2 |
| pbw | 60 | 60 | 58 | 58 | 29, 29 | 100 |
| Glycol | — | MPD, 2.0 | PG, 1.0 | — | DEG, 2.0 | — |
| DEOA | — | — | — | — | — | 0.4 |
| Water | 2.0 | 2.0 | 1.9 | 1.9 | 2.0 | 2.0 |
| C-183 | — | — | 0.34 | 0.40 | — | — |
| 33-LV | 0.70 | 0.60 | — | — | 0.70 | — |
| T-9 | 0.06 | 0.12 | 0.12 | 0.12 | 0.12 | 0.04 |
| L-620 | 0.6 | 0.6 | 0.8 | 0.4 | 0.6 | 0.4 |
| FR | 3.0 | 3.0 | 3.0 | 3.0 | 3.0 | 5.0 |
| TDI (80/20) | 35.8 | 34.3 | 33.6 | 32.3 | 35.1 | 35.4 |
| Index | 100 | 100 | 100 | 100 | 100 | 83 |
| Foam Processing | | | | | | |
| Blowoff, s | 158 | 161 | 166 | 144 | 126 | 229 |
| Settle, % | 1.0 | 0.4 | 0.2 | 1.2 | 0.5 | 6.0 |
| Shrink | nil | nil | nil | nil | nil | nil |
| Foam Properties | | | | | | |
| Density, pcf | 2.74 | 2.72 | 2.83 | 2.82 | 2.68 | 3.15 |
| Resilience, % | 8 | 13 | 5 | 8 | 9 | 10 |
| Air flow, scfm | 1.8 | 1.1 | 0.3 | 2.2 | 1.1 | 0.7 |
| 25% IFD, lbs | 11.6 | 11.5 | 13.8 | 8.8 | 10.8 | 10.6 |
| 25% Return, % | 62.3 | 71.2 | 70.3 | 76.6 | 67.0 | 87.5 |
| Tensile, psi | 11.5 | 8.7 | 10.1 | 9.5 | 9.1 | 9.6 |
| Elongation, % | 235 | 20 | 230 | 234 | 235 | 238 |
| Tear, pli | 0.8 | 0.6 | 0.9 | 0.6 | 0.9 | 0.9 |
| 90% CS, % | 5.3 | 9.1 | 8.2 | 6.7 | 9.3 | 5.9 |
| 75% HACS, % | 7.2 | 11.6 | 7.0 | 5.1 | 9.7 | 11.4 |

TABLE 4

Effect of Index

| Example | 20 | 21 | 22 | 23 | 24 | 25 | C26 | C8 |
|---|---|---|---|---|---|---|---|---|
| Formulation | | | | | | | | |
| Monol | M7 | M7 | M7 | M1 | M1 | M1 | — | — |
| pbw | 40 | 40 | 40 | 50 | 50 | 50 | — | — |
| OH # | 14 | 14 | 14 | 45 | 45 | 45 | — | — |
| Polyol | P1 | P1 | P1 | P1 | P1 | P1 | P2 | P2 |
| pbw | 60 | 60 | 60 | 50 | 50 | 50 | 100 | 100 |
| DEOA | — | — | — | — | — | — | 0.4 | 0.4 |
| Water | 2.0 | 2.0 | 2.0 | 2.0 | 2.0 | 2.0 | 2.0 | 2.0 |
| C-183 | — | — | — | 0.45 | 0.45 | 0.45 | — | — |
| 33-LV | 0.70 | 0.70 | 0.70 | — | — | — | — | — |
| A-1 | — | — | — | — | — | — | 0.18 | 0.18 |
| T-9 | 0.06 | 0.06 | 0.06 | 0.08 | 0.08 | 0.08 | 0.04 | 0.04 |
| L-620 | 0.6 | 0.6 | 0.6 | 0.6 | 0.6 | 0.6 | 0.4 | 0.4 |
| FR | 3.0 | 3.0 | 3.0 | 3.0 | 3.0 | 3.0 | 5.0 | 5.0 |
| TDI (80/20) | 35.8 | 37.6 | 39.4 | 34.1 | 35.9 | 37.6 | 42.8 | 35.4 |
| Index | 100 | 105 | 110 | 95 | 100 | 105 | 100 | 83 |

TABLE 4-continued

Effect of Index

| Example | 20 | 21 | 22 | 23 | 24 | 25 | C26 | C8 |
|---|---|---|---|---|---|---|---|---|
| Foam Processing | | | | | | | | |
| Blowoff, s | 157 | 148 | 144 | 203 | 180 | 165 | none | 229 |
| Settle, % | 1.1 | 1.1 | 2.9 | 1.1 | 1.1 | 1.6 | 1.0 | 6.0 |
| Shrink | nil | nil | nil | nil | nil | slight | excessive | nil |
| Foam Properties | | | | | | | | |
| Density, pcf | 2.71 | 2.72 | 2.81 | 2.62 | 2.58 | 2.71 | not testable | 3.15 |
| Resilience, % | 8 | 10 | 14 | 10 | 11 | 13 |  | 10 |
| Air flow, scfm | 1.8 | 2.0 | 3.2 | 4.3 | 3.7 | 2.5 |  | 0.7 |
| 25% IFD, lbs | 11.6 | 15.2 | 25.8 | 6.2 | 7.5 | 10.0 |  | 10.6 |
| 25% Return, % | 65.2 | 56.3 | 49.2 | 81.7 | 82.2 | 81.0 |  | 87.5 |
| Tensile, psi | 11.4 | 14.4 | 19.3 | 5.9 | 7.6 | 10.1 |  | 9.6 |
| Elongation, % | 181 | 148 | 97 | 200 | 215 | 189 |  | 238 |
| Tear, pli | 0.9 | 1.1 | 1.5 | 0.7 | 0.7 | 0.8 |  | 0.9 |
| 90% CS, % | 5.7 | 5.6 | 6.6 | 86.9 | 81.3 | 18.5 |  | 5.9 |
| 75% HACS, % | 7.5 | 5.9 | 6.6 | 57.0 | 28.5 | 18.2 |  | 11.4 |

TABLE 5

Effect of Water Level

| Example | 27 | 28 | 29 | C30 | C31 |
|---|---|---|---|---|---|
| Formulation | | | | | |
| Monol | M7 | M7 | M7 | — | — |
| pbw | 40 | 40 | 40 | — | — |
| Polyol | P1 | P1 | P1 | P2 | P2 |
| pbw | 60 | 60 | 60 | 100 | 100 |
| DEOA | — | — | — | 0.4 | — |
| Water | 1.0 | 2.0 | 3.0 | 1.0 | 1.0 |
| C-183 | — | — | 0.15 | — | — |
| 33-LV | 1.40 | 0.70 | — | — | — |
| A-1 | — | — | — | 0.50 | 0.50 |
| T-9 | 0.01 | 0.06 | 0.13 | 0.01 | 0.01 |
| L-620 | 0.1 | 0.6 | 0.6 | 0.1 | 0.1 |
| FR | 3.0 | 3.0 | 3.0 | 3.0 | 3.0 |
| TDI (80/20) | 26.2 | 35.8 | 45.5 | 27.5 | 32.1 |
| Index | 100 | 100 | 100 | 83 | 100 |
| Foam Processing | | | | | |
| Blowoff, s | undetected | 158 | 140 | none | none |
| Settle, % | 1.1 | 1.0 | 2.1 | 2.5 | 0.2 |
| Shrink | nil | nil | nil | excessive | excessive |
| Foam Properties | | | | | |
| Density, pcf | 4.87 | 2.74 | 1.93 | not testable | not testable |
| Resilience, % | 0 | 8 | 14 |  |  |
| Air flow, scfm | 1.2 | 1.8 | 5.3 |  |  |
| 25% IFD, lbs | 14.3 | 11.6 | 13.5 |  |  |
| 25% Return, % | 87.0 | 62.3 | 50.9 |  |  |
| Tensile, psi | 8.4 | 11.5 | 11.9 |  |  |
| Elongation, % | 209 | 235 | 129 |  |  |
| Tear, pli | 0.6 | 0.8 | 0.7 |  |  |
| 90% CS, % | 2.3 | 5.3 | 11.3 |  |  |
| 75% HACS, % | 2.5 | 7.2 | 13.3 |  |  |

TABLE 6

Effect of Reactive Monol

| Example | 32 | 33 | 34 | 35 | C36 | C37 | C38 | C39 |
|---|---|---|---|---|---|---|---|---|
| Formulation | | | | | | | | |
| Monol | M12 | M12 | M12 | M12 | — | M11 | M11 | M11 |
| % 1° OH | >90 | >90 | >90 | >90 | — | <12 | <12 | <12 |
| pbw | 50 | 50 | 50 | 50 | — | 35 | 35 | 35 |
| Polyol | P11 | P11 | P11 | P11 | P11 | P11 | P11 | P11 |
| pbw | 50 | 50 | 50 | 50 | 100 | 65 | 65 | 65 |
| Water | 1.10 | 1.10 | 1.25 | 1.25 | 1.10 | 1.10 | 1.10 | 1.10 |
| A-1 | 0.14 | 0.15 | 0.14 | 0.15 | 0.14 | 0.17 | 0.14 | 0.15 |
| 33-LV | 0.30 | 0.30 | 0.30 | 0.30 | 0.35 | 0.40 | 0.32 | 0.30 |
| T-9 | 0.05 | 0.05 | 0.05 | 0.05 | 0.05 | 0.05 | 0.05 | 0.05 |
| B8002 | 0.70 | 0.70 | 0.70 | 0.70 | 0.70 | 0.70 | 0.70 | 0.70 |
| TDI (65/35) Index | 100 | 105 | 103 | 107 | 95 | 85 | 90 | 95 |
| Foam Properties | | | | | | | | |
| Density, kg/m$^3$ | 83 | 80 | 78 | 76 | 77 | 84 | 82 | 79 |
| Resilience, % | 0 | 0 | 0 | 2 | 7 | 0 | 0 | 4 |
| CLD, kPa, 40% | 0.90 | 1.35 | 1.18 | 1.62 | 5.20 | 0.70 | 1.73 | 2.07 |
| Tensile, kPa | 28.7 | 25.9 | 27.0 | 29.0 | 49.1 | 35.2 | 35.5 | 38.8 |
| Elongation, % | 147 | 155 | 139 | 132 | 235 | 224 | 223 | 197 |

TABLE 6-continued

Effect of Reactive Monol

| Example | 32 | 33 | 34 | 35 | C36 | C37 | C38 | C39 |
|---|---|---|---|---|---|---|---|---|
| 70% Comp. set | 10 | 8 | — | — | 8 | 11 | 11 | 9 |
| 70% HACS | 5 | 4 | — | — | 3 | 7 | 6 | 6 |
| 2,4-TDA, ppm | 4.5 | 1.1 | 0.4 | <0.3 | 15 | 23 | 20 | 18 |
| Hand feel | non-oily | non-oily | non-oily | non-oily | non-oily | oily | oily | slightly oily |

TABLE 7

Description of Monols, Polyols, and Formulation Components

Monols:

| | |
|---|---|
| MS-1 | A blend of monols having an average mol. wt. of about 200 used as a starter for making the other monols. |
| M-1 | 45 OH #, all-PO. |
| M-2 | 42 OH #, made by double metal cyanide (DMC)-catalyzed alkoxylation of MS-1 with a 7/93 blend of EO/PO to 1100 mol. wt., followed by tipping with a 70/30 blend of EO/PO to a final mol. wt. of 1335. Total EO content: 20%. |
| M-3 | 13 OH #, made by DMC-catalyzed alkoxylation of M-6 with a 12/88 blend of EO/PO to 3400 mol. wt., followed by tipping with 70/30 EO/PO to a final mol wt. of 4315. Total EO content: 20%. Primary OH content: 39%. |
| M-4 | 62 OH #, made by propoxylating MS-1. No EO cofeed. |
| M-5 | 112 OH #, made by alkoxylating allyl alcohol with 3/97 EO/PO to 210 mol. wt., followed by tipping with 70/30 EO/PO to mol. wt. 501. Total EO content: 45%. |
| M-6 | 35 OH #, made by propoxylating MS-1 using DMC catalyst. No EO cofeed. |
| M-7 | 14 OH #, made by propoxylating MS-1 using DMC catalyst. No EO cofeed. |
| M-8 | 20 OH #, made by DMC-catalyzed alkoxylation of M-4 with 10/90 EO/PO to 2340 mol. wt., followed by tipping with 60/40 EO/PO to mol. wt. 2800. Total EO content: 15%. Primary OH content: 37%. |
| M-11 | 16 OH #, made by propoxylation of allyl alcohol, <12% primary hydroxyl groups. |
| M-12 | 25 OH #, made by propoxylation of allyl alcohol to mol. wt. 1800, followed by capping with EO to a final mol. wt. of 2200; >90% primary OH groups. |

Polyols

| | |
|---|---|
| P-1 | 168 OH #, made by propoxylating glycerine. |
| P-2 | Commercial polyol blend used to make viscoelastic foam. It has OH # 145 and a functionality of 3. |
| P-4 | 112 OH #, made by propoxylating glycerine. |
| P-5 | 137 OH # triol made by DMC-catalyzed alkoxylation of a 240 OH # starter triol (propoxylated glycerine) with 8/92 EO/PO to 1025 mol. wt., followed by tipping with 60/40 EO/PO to mol. wt. 1230. Total EO content: 15%. Primary OH content: 29%. |
| P-11 | 240 OH #, made by propoxylating glycerine. |

Other components

| | |
|---|---|
| DEOA | diethanolamine |
| DEG | diethylene glycol |
| PG | propylene glycol |
| DPG | dipropylene glycol |
| MPD | 2-methyl-1,3-propanediol |
| C-183 | Niax C-183 amine catalyst blend |
| 33-LV | Dabco 33-LV amine catalyst |
| A-1 | Niax A-1 amine catalyst |
| T-9 | stannous octoate |
| T-12 | dibutyltin dilaurate |
| L-620 | Niax silicone surfactant, product of CK Witco |
| B8002 | silicone surfactant, product of Goldschmidt |
| FR | flame retardant |
| TDI | toluene diisocyanate (standard 80/20 or 65/35 blend) |

The preceding examples are meant only as illustrations. The following claims define the invention.

We claim:

1. A viscoelastic polyurethane foam which comprises the reaction product of water, a surfactant, one or more catalysts, a polyisocyanate, and an isocyanate-reactive mixture comprising:
    (a) a polyester or polyoxyalkylene monol having a number average equivalent weight greater than about 1000 and an OH number less than about 56;
    (b) a polyester or polyoxyalkylene polyol having a number average equivalent weight less than about 600 and an OH number greater than about 94; and
    (c) optionally, a chain extender or crosslinker;
wherein the monol comprises from about 15 to about 70 wt. % of the isocyanate-reactive mixture;
wherein the foam is produced at an isocyanate index of at least 90; and
wherein the foam has a resilience less than about 15%.

2. The foam of claim 1 having a 90% compression set less than about 15%.

3. The foam of claim 1 wherein the monol is a polyoxypropylene monol having a number average equivalent weight greater than about 1500.

4. The foam of claim 1 wherein the monol comprises at least about 25 wt. % of the isocyanate-reactive mixture.

5. The foam of claim 1 having a resilience less than about 5%.

6. The foam of claim 1 wherein the monol has a primary hydroxyl end group content within the range of about 15 to about 50%.

7. The foam of claim 1 wherein the monol has a primary hydroxyl end group content greater than about 50%.

8. The foam of claim 7 wherein the monol has a primary hydroxyl end group content greater than about 90%.

9. The foam of claim 1 wherein the polyol is a copolymer of ethylene oxide and propylene oxide having an oxyethylene content within the range of about 5 to about 50 wt. %.

10. The foam of claim 1 wherein the chain extender or crosslinker has a number average molecular weight less than about 200 and is used in an amount within the range of about 0.1 to about 5 wt. % based on the amount of isocyanate-reactive mixture.

11. The foam of claim 1 further comprising from about 0.1 to about 30 wt. % of a plasticizer.

12. The foam of claim 7 having a non-oily "hand feel."

13. The foam of claim 7 having a compression load deflection (40% CLD) value, measured at the first compression cycle, within the range of about 0.7 to about 1.5 kPa.

14. A viscoelastic polyurethane foam which comprises the reaction product of water, a surfactant, one or more catalysts, toluene diisocyanate, and a polyether mixture comprising:
    (a) a polyoxyalkylene monol having a number average equivalent weight greater than about 1000 and an OH number less than about 56;
    (b) a polyoxyalkylene polyol having a number average equivalent weight less than about 600 and an OH number greater than about 94;

(c) optionally, a chain extender or crosslinker;

wherein the monol comprises from about 20 to about 60 wt. % of the isocyanate-reactive mixture;

wherein the foam is produced at an isocyanate index of at least 95; and wherein the foam has a resilience less than about 15%.

15. The foam of claim 14 having a 90% compression set less than about 15%.

16. The foam of claim 14 wherein the polyoxypropylene monol has a number average equivalent weight greater than about 2000.

17. The foam of claim 14 wherein the monol comprises at least about 25 wt. % of the polyether mixture.

18. The foam of claim 14 having a resilience less than about 5%.

19. The foam of claim 14 wherein the monol has a primary hydroxyl end group content within the range of about 15 to about 50%.

20. The foam of claim 14 wherein the monol has a primary hydroxyl end group content greater than about 50%.

21. The foam of claim 20 wherein the monol has a primary hydroxyl end group content greater than about 90%.

22. The foam of claim 14 wherein the polyol is a copolymer of ethylene oxide and propylene oxide having an oxyethylene content within the range of about 5 to about 50 wt. %.

23. The foam of claim 14 wherein the chain extender or crosslinker has a number average molecular weight less than about 200 and is used in an amount within the range of about 0.1 to about 5 wt. % based on the amount of isocyanate-reactive mixture.

24. The foam of claim 20 having a non-oily "hand feel."

25. The foam of claim 20 having a compression load deflection (40% CLD) value, measured at the first compression cycle, within the range of about 0.7 to about 1.5 kPa.

26. The foam of claim 14 having a residual toluenediamine content following curing of less than 5 ppm.

27. The foam of claim 20 having a residual toluenediamine content following curing of less than 5 ppm.

28. The foam of claim 14 further comprising from about 0.1 to about 30 wt. % of a plasticizer.

29. In a process for making a viscoelastic polyurethane foam by reacting water, a surfactant, one or more catalysts, a polyisocyanate, and an isocyanate-reactive mixture, the improvement which comprises using as the isocyanate-reactive mixture:

(a) a polyester or polyoxyalkylene monol having a number average equivalent weight greater than about 1000 and an OH number less than about 56;

(b) a polyester or polyoxyalkylene polyol having a number average equivalent weight less than about 600 and an OH number greater than about 94; and (c) optionally, a chain extender or crosslinker;

wherein the monol comprises from about 15 to about 70 wt. % of the isocyanate-reactive mixture;

wherein the foam is produced at an isocyanate index of at least 90; and wherein the foam has a resilience less than about 15%.

* * * * *